(12) United States Patent
Selby et al.

(10) Patent No.: US 7,228,600 B1
(45) Date of Patent: Jun. 12, 2007

(54) CARABINER BUNGEE CORD TERMINUS

(75) Inventors: Ricky W. Selby, Danielson, CT (US); Hayward Kendall Kelley, III, Newport Coast, CA (US); Robert Lee Gast, Irvine, CA (US); Donald Thomas, Cordova, TN (US); Raymond N. Hunt, East Lyme, CT (US)

(73) Assignees: Keeper Corporation, North Windham, CT (US); Hampton Products International Corporation, Foothill Ranch, CA (US)

( * ) Notice: Subject to any disclaimer, the term of this patent is extended or adjusted under 35 U.S.C. 154(b) by 29 days.

(21) Appl. No.: 11/246,319

(22) Filed: Oct. 7, 2005

(51) Int. Cl.
*F16B 45/02* (2006.01)
*F16B 45/00* (2006.01)
(52) U.S. Cl. ............... 24/300; 24/601.5; 24/265 H
(58) Field of Classification Search ............ 24/600.9, 24/599.6, 599.4, 599.1, 300, 256 H; 182/6, 182/9
See application file for complete search history.

(56) References Cited

U.S. PATENT DOCUMENTS

| | | | |
|---|---|---|---|
| 3,293,712 A * | 12/1966 | Mark ................. | 24/710.1 |
| 3,444,599 A * | 5/1969 | Amon ................. | 24/601.2 |
| 3,748,703 A | 7/1973 | Maillocheau | |
| 4,380,101 A | 4/1983 | Joubert et al. | |
| 5,517,735 A | 5/1996 | Tsai | |
| 5,638,584 A | 6/1997 | De Anfrasio | |
| 5,913,479 A * | 6/1999 | Westwood, III | 24/298 |
| 6,688,259 B2 * | 2/2004 | Axel .................. | 119/792 |
| 6,742,685 B2 | 6/2004 | Williams | |
| 6,851,163 B2 | 2/2005 | Selby | |
| 6,938,306 B2 * | 9/2005 | Joubert et al. ......... | 24/300 |
| 2005/0050695 A1 * | 3/2005 | Mackey et al. ........ | 24/300 |

FOREIGN PATENT DOCUMENTS

WO    WO 00/01957    1/2000

* cited by examiner

*Primary Examiner*—Robert J. Sandy
(74) *Attorney, Agent, or Firm*—M. P. Williams

(57) ABSTRACT

A conventional carabiner (11) is molded directly into a plastic base (10), with the pivoted end of a closure gate (23) being toward the base. The base may also restrain a bungee cord (9) by having the end thereof and a wire crimp (15) molded into the base, or the base may have a bungee cord passageway (40) with cleat (41), into which the bungee cord may be pulled so as to lock the base in a desired position along the bungee cord.

4 Claims, 2 Drawing Sheets

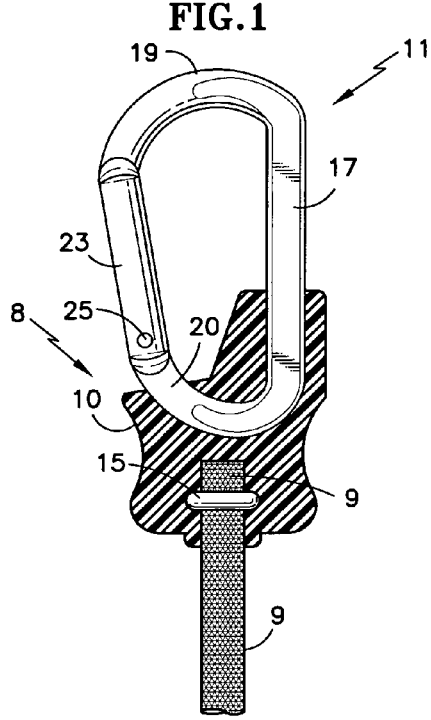
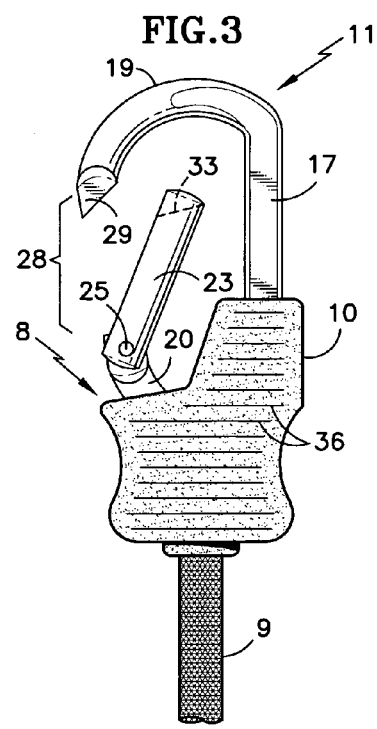
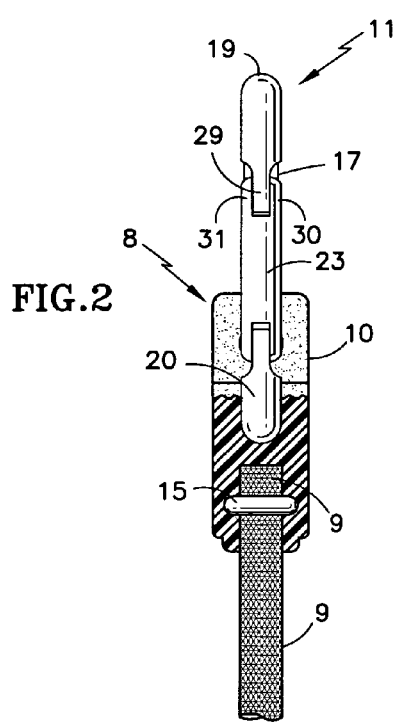

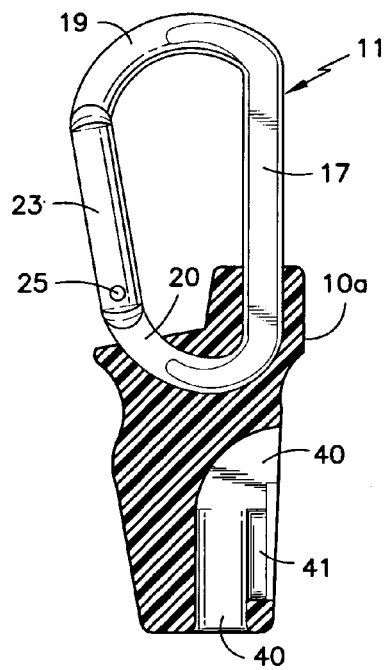
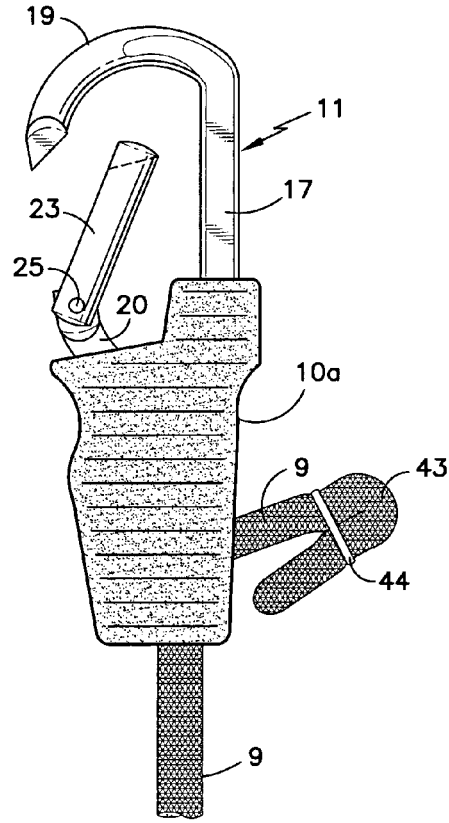
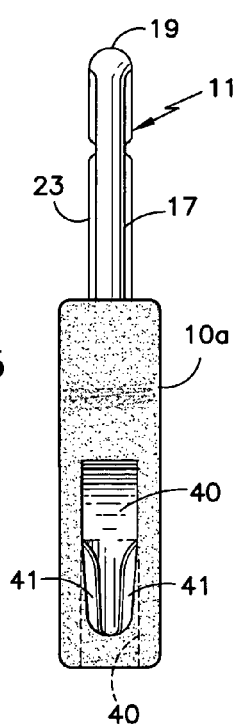

CARABINER BUNGEE CORD TERMINUS

TECHNICAL FIELD

This invention relates to a bungee cord (stretch cord) terminus which has a metal carabiner captured in a molded plastic base with an inwardly opening closure gate, spring-loaded toward the terminus, thereby to provide secure fastening through or about an anchor point.

BACKGROUND ART

Bungee cords are extremely common and used in a variety of ways. The most simple and common bungee cord terminus is a stiff wire hook which is crimped to the end of the bungee cord. The position of one form of terminus known in the art is adjustable along the length of the cord; in other forms the position is fixed. A variety of still other forms are known to provide a variety of features to suit different applications. Many have open hooks; others rely on thin plastic closures.

DISCLOSURE OF INVENTION

Objects of the invention include: a bungee cord terminus which is extremely secure when in place; a sturdy bungee cord terminus which may reliably engage a variety of anchors; a bungee cord terminus with an easily-openable closure gate which, however, is reliably secure when closed; and an improved bungee cord terminus.

According to the present invention, a bungee cord terminus includes a metal carabiner with an inwardly-opening, spring-loaded closure gate, molded directly into a terminus base, which surrounds a rounded end of the carabiner to which the closure gate is pivoted; the base also has provision to secure it to a bungee cord.

The invention provides a bungee cord terminus which, when engaged around or through an anchor point, is secure and will not release from the anchor point, except by inward movement of the closure gate thereof by an operator.

In the prior art, provisions, such as a terminus with a ring in it, have been suggested for use with carabiners. However, a carabiner which is simply passed through a ring may be turned with its small end away from the bungee cord, or may even be removed, and the bungee cord affixed in some unsafe way, thereby rendering it dangerous to the user. The present invention avoids difficulties of such an arrangement by assuring that the end of the carabiner to which the closure gate is pivoted is fixed with respect to the position of the bungee cord. This is an important aspect of the present invention.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a sectioned, side elevation view of one form of the invention.

FIG. 2 is a partially sectioned front elevation view of the terminus of FIG. 1.

FIG. 3 is a side elevation view of the terminus of FIG. 1 with the closure gate open.

FIG. 4 is a sectioned, side elevation view of an adjustable form of terminus of the invention.

FIG. 5 is a front elevation view of the terminus of FIG. 4.

FIG. 6 is a side elevation view of the terminus of FIG. 4 locked to a bungee cord.

MODE(S) FOR CARRYING OUT THE INVENTION

Referring to FIGS. 1 and 2, a terminus 8 for a bungee cord 9 comprises a molded, glass-filled plastic base 10 having a conventional carabiner 11 captured by being molded therein. In a preferred embodiment of the invention, the carabiner 11 comprises anodized aluminum.

The bungee cord 9 has a wire crimp 15, which may otherwise comprise a hog ring or other suitable crimp, which is molded, together with the end of the bungee cord 9, directly into the base 10, thus firmly anchoring the bungee cord 9 into the base 10.

The carabiner 11 may have a reduced thickness portion 17, or it may all comprise the same diameter. The carabiner 11 has a large rounded end 19 and a small rounded end 20 joined together by the portion 17. There is a closure gate 23 rotatably disposed to the small end 20 by means of a pivot 25. A spring (not shown) urges the closure gate 23 counter-clockwise, into the closed position shown in FIGS. 1 and 2.

As seen in FIG. 3, the closure gate 23 may be pushed clockwise to reveal an opening 28 in the carabiner 11, as a result of rotation of the closure gate clockwise about the pin 25, by a person using it. A reduced thickness portion 29 of the large end 19 causes the closure gate 23 to be aligned therewith by virtue of two lips 30, 31 (FIG. 2) which form a triangular notch 33 on the closure gate 23, which prevents the closure gate 23 from rotating past the closed position of the carabiner. However, carabiners of other detail may be utilized within the purview of the present invention.

The bungee cord 9 may have a terminus 8 of the type described with respect to FIGS. 1-3 disposed on an end thereof opposite to that shown in FIGS. 1-3. On the other hand, the other end of the bungee cord may have a different sort of terminus, depending upon the use to which the bungee cord is to be put. As an example, the position of the terminus on the other end of the bungee cord 9 may be adjustable, as is illustrated in U.S. Pat. No. 6,851,163; or, the terminus on the other end may be flexible, as illustrated in copending U.S. patent application Ser. No. 11/226,119, filed Sep. 14, 2005, or it may take other forms.

In FIG. 3, a plurality of lines 36 illustrate that there may be ridges or other surface undulations to improve the grip of a person using the terminus, but the surface of the molded base 10 is not significant to the present invention.

In the embodiment of FIGS. 1-3, the base 10 has a bungee cord axial-movement restriction molded therein: in FIGS. 1-3, the restriction is the wire crimp 15. In another embodiment of the invention illustrated in FIGS. 4-6, the bungee cord axial-movement restriction molded into the base 10a comprises a cord passageway 40 including a cleat 41 into which the cord 9 may be pulled, thereby locking the terminus 10a to the cord 9. The cord 9 may be turned on itself, in a bend 43, and crimped with a hog ring 44, or the like, so as to prevent the terminus 10a from slipping off the end of the cord. With the cord 9 pulled away from the anvil 41 to the upper portion of the passageway 40, the terminus 10a can be slid along the cord to a desired position, after which the cord can again be locked into the cleat 41 as shown in FIG. 6. The nature and operation of this sort of adjustable tie-down stretch cord terminus is set forth in the aforementioned patent, the details of which are not relevant to the present invention. It suffice that a carabiner is molded directly into a terminus, whether adjustable or fixed with respect to the bungee cord or other stretch cord.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A bungee cord and terminus comprising:
   a bungee cord;
   a metal carabiner having a small rounded end connected to a large rounded end and including a closure gate, a first end of which is pivotally disposed on said small rounded end and resiliently urged by a spring into an outward, closed position in which a second end of said gate is in contact with said large rounded end, said large rounded end restraining said closure gate from rotation outwardly past a closed position, said gate being rotatable by a person, against the force of said spring, inwardly, into an open position, and
   a molded base having a bungee cord axial-movement restriction molded within said base, said carabiner being molded into said base, a substantial portion of said small rounded end being surrounded by said base.

2. A bungee cord and terminus according to claim 1 wherein:
   said axial-movement restriction comprises a wire crimp or hog ring near the end of said bungee cord, the end of said bungee cord with said wire crimp or hog ring being captured by being molded into said base.

3. A bungee cord and terminus according to claim 1 wherein:
   said axial-movement restriction comprises a bungee cord passageway with a cleat formed therein into which said bungee cord may be pulled to thereby lock the terminus in a desired position on the bungee cord.

4. A bungee cord terminus comprising:
   a carabiner having a small rounded end connected to a large rounded end and including a closure gate, a first end of which is pivoted on said small rounded end, said closure gate being resiliently urged by a spring into an outward, closed position in which a second end of said gate is in contact with said large rounded end; and
   a molded base having a bungee cord axial-movement restriction molded within said base, said carabiner being molded into said base, a substantial portion of said small rounded end being surrounded by said base.

* * * * *